United States Patent [19]

Kakimoto et al.

[11] 4,227,372
[45] Oct. 14, 1980

[54] MOTOR VEHICLE EQUIPPED WITH TURBOCHARGER

[75] Inventors: Kunihiko Kakimoto, Yokohama; Masaru Kodaira, Kodaira, both of Japan

[73] Assignee: Nissan Motor Company, Limited, Yokohama, Japan

[21] Appl. No.: 935,853

[22] Filed: Aug. 22, 1978

[30] Foreign Application Priority Data

Aug. 24, 1977 [JP] Japan .................................. 52-101946

[51] Int. Cl.³ .................................................. F02B 37/00
[52] U.S. Cl. ......................................... 60/602; 60/611; 180/178
[58] Field of Search ................. 60/600, 601, 602, 603, 60/611; 123/119 C; 180/170, 178

[56] References Cited

U.S. PATENT DOCUMENTS

| 1,856,024 | 4/1932 | Buchi | 60/603 |
|---|---|---|---|
| 2,067,757 | 1/1937 | Fielden | 123/119 C |
| 2,384,381 | 9/1945 | Jocelyn | 123/119 CB |
| 2,444,644 | 7/1948 | Fulleman | 60/602 |
| 3,150,814 | 9/1964 | Evans et al. | 60/602 X |
| 3,270,495 | 9/1966 | Connor | 60/602 |
| 4,024,706 | 5/1977 | Adawi et al. | 60/299 X |
| 4,051,817 | 10/1977 | Hattori et al. | 123/32 EA |

FOREIGN PATENT DOCUMENTS

| 2441804 | 3/1976 | Fed. Rep. of Germany | 60/611 |
|---|---|---|---|
| 209216 | 6/1940 | Switzerland | 60/602 |

*Primary Examiner*—Michael Koczo
*Attorney, Agent, or Firm*—Schwartz, Jeffery, Schwaab, Mack, Blumenthal & Koch

[57] ABSTRACT

A motor vehicle comprises a turbocharger, a vehicle speed sensor, and means for decreasing the pressure of air pressurized by the turbocharger when the vehicle speed sensor senses a predetermined high vehicle speed so that the maximum vehicle speed is limited to a desirable level.

15 Claims, 1 Drawing Figure

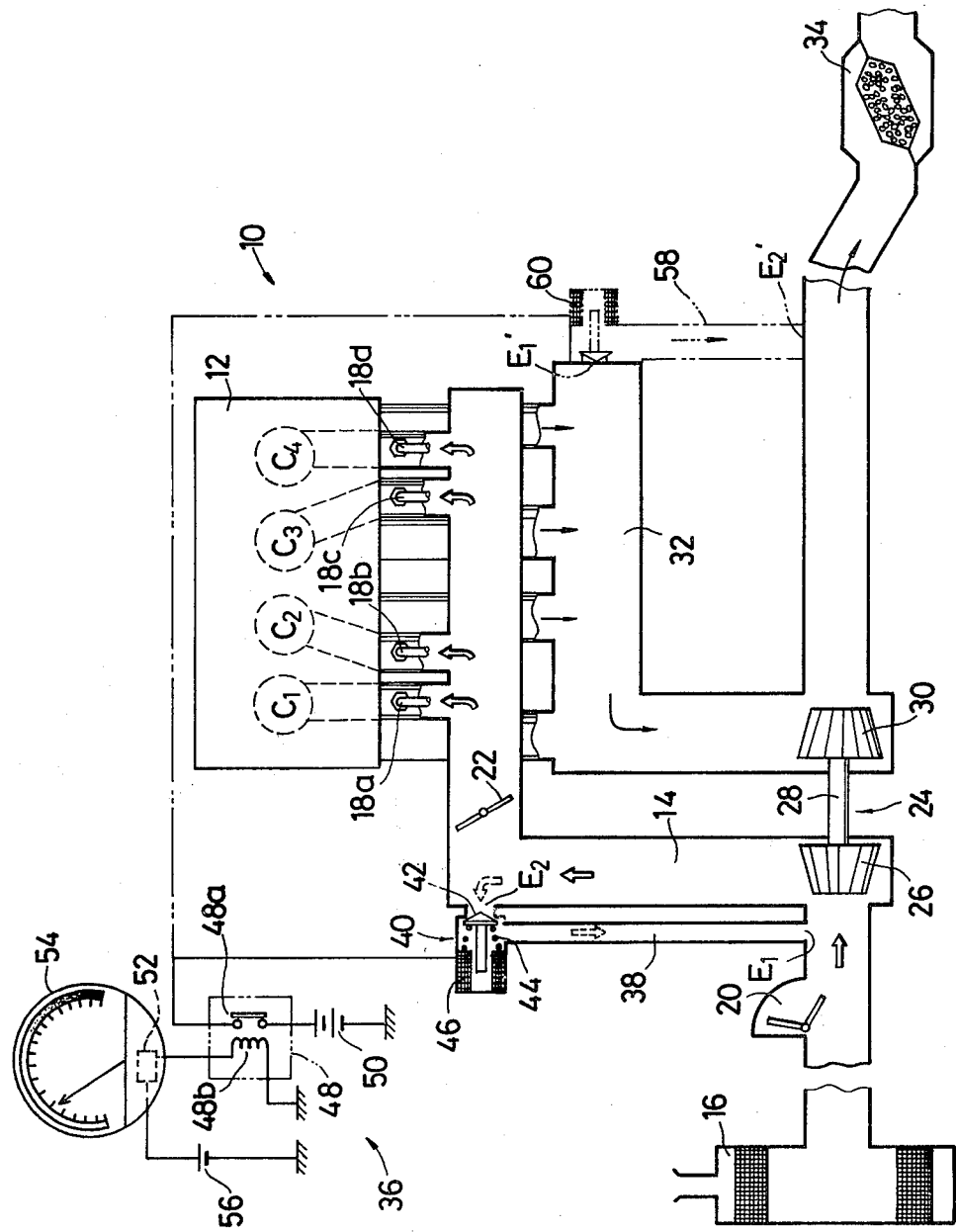

MOTOR VEHICLE EQUIPPED WITH TURBOCHARGER

BACKGROUND OF THE INVENTION

This invention relates to an internal combustion engine equipped with a turbocharger driven by exhaust gas pressure, and more particularly to a maximum vehicle speed limiting device of the engine equipped with the turbocharger.

It is well known in the art, that internal combustion engines are equipped with turbochargers. The turbocharger has a turbine wheel which is fixedly connected through a common shaft to a compressor wheel. The compressor wheel is driven by the rotated turbine wheel to pressurize intake air inducted into the combustion chambers of the engine. In such an engine, the charging efficiency is considerably high improving engine power output to a considerable extent. As a result, the maximum speed of a motor vehicle such as an automobile on which the above mentioned engine is mounted can be greatly increased.

However, motor vehicles having an excessively high maximum speed are undesirable from a point of view of safe driving. Accordingly, it is necessary to limit the maximum speed of the vehicle to a safe level. In this regard, the following measures have been already proposed:

(1) the maximum power output of the engine is suppressed;

(2) engine speed is suppressed by de-energizing the ignition system of the engine. However, the former measure is undesirable since acceleration performance is also unavoidably deterioratated. The latter measure is also undesirable since engine power output is abruptly lowered when the ignition system is de-energized accompanying abrupt decrease in vehicle speed which is very dangerous for vehicle occupants.

SUMMARY OF THE INVENTION

It is the prime object of the present invention to provide an improved motor vehicle equipped with a turbocharger, in which the maximum vehicle speed can be suppressed to a desirable level maintaining high engine power output and high acceleration performance of the engine, without creating any danger to the vehicle occupants.

Another object of the present invention is to provide an improved motor vehicle equipped with a turbocharger, in which the increase in engine power output is suppressed to govern vehicle speed within a desirable range, when the vehicle speed reaches a predetermined high level which is undesirable from a point of view of safe driving.

A further object of the present invention is to provide a maximum vehicle speed limiting device of a motor vehicle equipped with a turbocharger, by which vehicle speed can be governed within a desirable range by by-passing a part of intake air through a by-pass passage connected between the upstream and downstream sides of the compressor wheel of the turbocharger when the vehicle speed reaches a predetermined undesirable high level.

A still further object of the present invention is to provide a maximum vehicle speed limiting device of a motor vehicle equipped with turbocharger, by which vehicle speed can be governed within a desirable range by by-passing a part of exhaust gases through a by-pass passage connected between the upstream and downstream sides of the turbine wheel of the turbocharger when the vehicle speed reaches a predetermined undesirable high level.

Other objects, features and advantages of a motor vehicle according to the present invention will become more apparent from the following description taken in conjunction with the accompanying drawing.

BRIEF DESCRIPTION OF THE DRAWING

The single FIGURE is a schematic illustration of an essential part of a motor vehicle in accordance with present invention.

DESCRIPTION OF THE PREFERRED EMBODIMENT

Referring now to the single FIGURE, there is shown the essential parts of a preferred embodiment of a motor vehicle according to the present invention. The motor vehicle (an automobile in this case) comprises an internal combustion engine 10 which is mounted on a body (not shown) of the vehicle. The engine 10 comprises an engine body 12 which is formed with four combustion chambers $C_1$ to $C_4$ in this case. The combustion chambers $C_1$ to $C_4$ are communicable with four branch runners (no numerals) of an intake passageway 14 through which the combustion chambers are communicable with atmospheric air to induct air thereinto. The intake passageway 14 is provided at its one end with an air filter 16 for removing dusts contained in atmospheric air to be inducted.

The reference numerals 18a to 18d represent fuel injectors disposed in the branch runners of the intake passageway 14 to inject fuel into the branch runners, respectively. The fuel injectors 18a to 18d form part of an electronically controlled fuel injection system. In this case, the amount of fuel injected from each fuel injector is controlled in accordance with various engine operating parameters, for example, the amount of intake air flowing through the intake passageway 14. The amount of the intake air is measured by an air flow meter 20 operatively disposed in the intake passageway 14. The intake passageway 14 is provided therein with a throttle valve 22 for controlling the amount of the intake air supplied to the combustion chambers $C_1$ to $C_4$ through the intake passageway 14.

The engine 10 is provided with a turbocharger 24 which has a compressor wheel 26 fixedly connected through a common shaft 28 to a turbine wheel 30. The compressor wheel 26 is rotatably disposed in the intake passageway 14 between the air flow meter 20 and the throttle valve 22. The turbine wheel 30 is rotatably disposed in an exhaust gas passageway 32 which is communicable with the combustion chambers though not shown. Accordingly, exhaust gases from the combustion chambers $C_1$ to $C_4$ are discharged out of the engine 10 after being purified in an exhaust gas purifying device such as a so-called three-way catalytic converter 34 disposed in the intake passageway 34. The three-way catalytic converter functions to oxidize carbon monoxide and hydrocarbons and reduce nitrogen oxides.

With the thus arranged turbocharber 24, as the turbine wheel 30 is rotated by the pressure of the exhaust gases passing through the exhaust passageway 32, the compressor wheel 26 rotates to pressurize air passing through the intake passageway 14.

The pressurized air is thereafter supplied to the combustion chambers $C_1$ to $C_4$. Then, the metered fuel is appropriately injected from each fuel injector into the stream of the pressurized air passing through the branch runners of the intake passageway 14. The injected fuel is then inducted into the combustion chambers $C_1$ to $C_4$ to be combusted therein.

The engine 10 may be equipped with a blow-by gas recirculation system for recirculate so-called blow-by gas back to the combustion chambers though not shown. This system is necessary, because the pressure within the combustion chamber is considerably high and accordingly a relatively large amount of unburnt combustible gas is liable to leak from the combustion chamber through the clearance between the wall of an engine cylinder and the skirt of a piston. Furthermore, the engine 10 may be provided with a so-called exhaust gas recirculation system for supplying a part of exhaust gases back to the combustion chambers through the intake passage so as to lower the peak combustion temperature in the combustion chamber to considerably decrease the emission level of nitrogen oxides contained in exhaust gases. In such a case, the exhaust gas recirculation system may be arranged to supply a part of exhaust gases flowing through the exhaust gas passageway 32 upstream of the turbine wheel 30 into the intake passageway 14 downstream of the throttle valve 22.

Moreover, as viewed in the FIGURE, the engine 10 is supplied with a maximum vehicle speed limiting device 36 which is composed of a by-pass passage 38 having a first end $E_1$ and a second end $E_2$. The first end $E_1$ of the by-pass passage 38 is connected to the intake passageway 14 downstream of the air flow meter 20 and upstream of the compressor wheel 26. The second end $E_2$ of the by-pass passage 38 is connected to the intake passage 14 downstream of the compressor wheel 26 and upstream of the throttle valve 22.

A solenoid valve 40 is operatively disposed in the by-pass passage 38 to open or close the by-pass passage 38. The valve 40 has a moveable valve head 42 which is biased to close the by-pass passage 38 by the bias of a spring 44 upon de-energization of the solenoid coil 46. However, the valve head 42 is moved to open the by-pass passage 38 when attracted to the solenoid coil 46 of the valve 40 upon energization of the solenoid coil 46. It will be understood that intake air flowing through the intake passageway upstream of the compressor wheel 26 flows back in the direction indicated by phantom arrows through the by-pass passageway 38 into the intake passageway 14 upstream of compressor wheel 26 when the by-pass passage 38 is opened.

The solenoid coil 46 of the valve 40 is electrically connected to normally closed contacts 48a of a relay switch 48. The contacts 48a are arranged to open when a coil 48b is de-energized and to close when the coil 48b is energized. A contact point (no numeral) of the contacts 48a is electrically connected to a battery 50. Accordingly, when the contacts 48a are closed, the solenoid coil 46 is energized. The reference numeral 52 denotes a vehicle speed switch 52 disposed in and operatively connected to a speedometer 54 for measuring and displaying vehicle speeds. The vehicle speed switch 52 is electrically connected between a battery 56 and the coil 48a of the relay switch 48. The switch 52 is arranged to put into "on" position to supply electric current to the coil 48a to energize the same when the vehicle speed reaches a predetermined level such as 190 Km/hr. Accordingly, the switch 52 is put into "off" position to de-energize the coil 48b when the vehicle speed is below the predetermined level. It will be understood that it is also possible to constitute the circuit for controlling the energization of the solenoid coil 46 of the solenoid valve 40, by using the vehicle speed switch 52 connected directly to the solenoid coil 46 and the battery 50 connected to the switch 52.

In operation, when the speed of the vehicle on which the engine 10 is mounted exceeds 190 Km/hr, the vehicle speed switch is put into its "on" position to energize the coil 48b. Accordingly, the contacts 48a are closed to energize the solenoid coil 46 of the solenoid valve 40. The valve head 42 is then attracted to the solenoid coil 46 against the bias of the spring 44 to open the by-pass passage 38. As a result, a part of intake air flowing through the intake passageway 14 upstream of the compressor wheel 26 flows through the by-pass passageway 38 back to the intake passage 14 upstream of the compressor wheel 26. This lowers the pressure of intake air immediately upstream of the combustion chambers, causing the charging efficiency of the engine to lower. Hence, the increase in power output of the engine is suppressed to stop the increase in the vehicle speed. In order to prevent the power output of the engine from abruptly lowering, it is preferable to narrow a portion of the intake passage 14 at which the valve head 42 lies.

It will be appreciated that the above-mentioned vehicle speed switch 52 is replaceable with a switch which senses the rotational speed of a propeller shaft (not shown) of the vehicle to operate the solenoid valve 40.

Although the maximum vehicle speed limiting device 36 has been shown and described to be used in combination with the engine equipped with the electronically controlled fuel injection system, it may be also used in combination with an engine equipped with a carburetor or carburetors. In such a case the first end $E_1$ of the by-pass passage 38 may be opened to the atmosphere to discharge intake air from the second end $E_2$ of the by-pass passage 38 into the atmosphere, though not shown.

While the by-pass passage 38 forming part of the vehicle speed switch 52 has been shown and described to be connected to the intake passage 14, it will be noted that the by-pass passage 38 is replaceable with a by-pass passage 58 shown in phantom, which by-pass passage is provided with a solenoid valve 60 which is substantially the same in construction as the solenoid valve 40. Accordingly, in such a case, the solenoid valve 60 may be electrically connected to the contacts 48a of the relay switch 48. As viewed in figure, the by-pass passage 58 has first and second ends $E_1'$ and $E_2'$. The first end $E_1'$ is connected to the exhaust gas passageway 32 upstream of the turbine wheel 30 of the turbocharger 24. The second end $E_2'$ is connected to the exhaust gas passageway 32 downstream of the turbine wheel 30 and upstream of the three-way catalytic converter 34.

With the by-pass passage 58 and the solenoid valve 60, when the vehicle speed exceeds the predetermined level, the by-pass passage 58 is opened to by-pass therethrough exhaust gases flowing through the exhaust gas passageway 32 upstream of the turbine wheel 30 into the exhaust gas passageway 32 downstream of the turbine wheel 30, as indicated by a dotted arrow. Then, the pressure for rotating the turbine wheel 30 is lowered and therefore the torque of the compressor wheel 26 is decreased. As a result, the charging efficiency of the engine is lowered, preventing engine power output from being further increased.

What is claimed is:

1. A motor vehicle having an engine body formed with combustion chambers, comprising:
- means defining an intake passageway through which the combustion chambers are communicable with atmospheric air to supply the combustion chambers with air;
- a turbocharger having a compressor wheel rotatably disposed in said intake passageway to pressurize air passing through said intake passageway, said turbocharger being driven by the pressure of exhaust gases discharged from the combustion chambers;
- vehicle speed sensing means for sensing a vehicle cruising speed of a predetermined level or higher to produce an electric signal; and
- means, responsive to said vehicle speed sensing means, for decreasing the pressure of air passing through said intake passageway downstream of said compressor wheel on receiving said electrical signal from said vehicle speed sensing means.

2. A motor vehicle as claimed in claim 1, in which the pressure decreasing means comprises
- means defining a intake air by-pass passage having first and second ends which are connected to said intake passageway, said first and second ends being connected to upstream and downstream sides of the compressor wheel of said turbocharger, respectively, and
- a valve operatively disposed in said intake air by-pass passage, said valve being opened to provide communication between the upstream and downstream sides of the compressor wheel when actuated on receiving said electric signal from said vehicle speed sensing means.

3. A motor vehicle as claimed in claim 2, in which said vehicle speed sensing means comprises a speedometer for measuring vehicle cruising speed, and switching means for producing said electric signal when said speedometer indicates that the vehicle cruising speed reaches the predetermined level or higher.

4. A motor vehicle as claimed in claim 3, in which the pressure decreasing means further comprises an actuating means for actuating the valve on receiving said electric signal from said switching means.

5. A motor vehicle as claimed in claim 4, further comprising
- fuel injectors constituting part of an electronically controlled fuel injection system, said fuel injectors being disposed at the branch runners of said intake passageway, respectively,
- a throttle valve operatively disposed in said intake passageway upstream of said fuel injectors to control the flow amount of air inducted into the combustion chambers;
- an air flow meter operatively disposed in said intake passageway upstream of the compressor wheel of said turbocharger to measure the flow amount of air passing through said intake passageway in order to provide a control signal to said electronically controlled fuel injection system.

6. A motor vehicle as claimed in claim 5, in which said intake air by-pass passage is located such that the first end thereof is connected to said intake passageway downstream of said air flow meter, and said second end thereof is connected to said intake passageway upstream of said throttle valve.

7. A motor vehicle as claimed in claim 4, in which said valve is a solenoid valve having a moveable valve head which is normally biased to close said intake air by-pass passage, the moveable valve head being attracted to the solenoid coil of said solenoid valve to open said intake air by-pass passage when the solenoid coil is energized.

8. A motor vehicle as claimed in claim 7, in which said actuating means includes a relay switch electrically connected to the solenoid coil of said solenoid valve, said relay switch energizing the solenoid valve then closed.

9. A motor vehicle as claimed in claim 8, in which said switching means is a vehicle speed switch operatively connected to said speedometer, said vehicle speed switch causing said relay switch to close on receiving from said speedometer an information signal indicating that the vehicle cruising speed reaches the predetermined level or higher.

10. A motor vehicle as claimed in claim 1, further comprising means defining an exhaust gas passageway through which the combustion chambers are communicable with atmospheric air, the turbine wheel of said turbocharger being rotatably disposed in said exhaust gas passageway.

11. A motor vehicle as claimed in claim 10, in which the pressure decreasing means comprises
- means defining an exhaust gas by-pass passage having first and second ends which are connected to said exhaust gas passageway, said first and second ends being connected to the upstream and downstream sides of the turbine wheel of said turbocharger, respectively, and
- a valve operatively disposed in said exhaust gas by-pass passage, said valve being opened to provide communication between the upstream and downstream sides of the compressor wheel when actuated on receiving said electric signal from said vehicle speed sensing means.

12. A motor vehicle as claimed in claim 11, further comprising a catalytic converter means for oxidizing carbon monoxide and hydrocarbons and reducing nitrogen oxides, said catalytic converter means being operatively disposed in said exhaust gas passageway downstream of the second end of said second by-pass passage.

13. A motor vehicle having an engine body formed with combustion chambers, comprising:
- means defining an intake passageway through which the combustion chambers are communicable with atmospheric air to supply the combustion chambers with air;
- a turbocharger having a compressor wheel rotatably disposed in said intake passageway to pressurize air passing through said intake passageway, said turbocharger being driven by the pressure of exhaust gases discharged from the combustion chambers;
- a speedometer for measuring the cruising speed of the vehicle;
- switching means operatively connected to said speedometer to produce an electric signal when said speedometer indicates that the vehicle cruising speed reaches a predetermined level or higher; and
- means for decreasing the pressure of air passing through said intake passageway downstream of said compressor wheel on receiving said electric signal from said switching means.

14. A motor vehicle having an engine body formed with combustion chambers, comprising:
- means defining an intake passageway through which the combustion chambers are communicable with atmospheric air to supply the combustion chambers with air;

a turbocharger having a compressor wheel rotatably disposed in said intake passageway to pressurize air passing through said intake passageway, said turbocharger being driven by the pressure of exhaust gases discharged from the combustion chambers;

means defining an intake air by-pass passage having first and second ends which are connected to said intake passageway, said first and second ends being connected to upstream and downstream sides of the compressor wheel of said turbocharger, respectively;

a speedometer for measuring the cruising speed of the vehicle;

switching means operatively connected to said speedometer to produce an electric signal when said speedometer indicates that the vehicle speed reaches a predetermined high level or higher; and a valve operatively disposed in said intake air by-pass passage, said valve being opened to provide communication between the upstream and downstream sides of the compressor wheel when actuated on receiving said electric signal from said switching means.

15. A motor vehicle having an engine formed with combustion chambers, comprising:

means defining an intake passageway through which the combustion chambers are communicable with atmospheric air to supply the combustion chambers with air;

a turbocharger having a compressor wheel rotatably disposed in said intake passageway to pressurize air passing through said intake passageway, said turbocharger being driven by the pressure of exhaust gases discharged from the combustion chambers;

means defining an exhaust gas passageway through which the combustion chambers are communicable with atmospheric air, the turbine wheel of said turbocharger being rotatably disposed in said exhaust gas passageway;

means defining an exhaust gas by-pass passage having first and second ends which are connected to said exhaust gas passageway, said first and second ends being connected to the upstream and downstream sides of the turbine wheel of said turbocharger, respectively;

a speedometer for measuring the cruising speed of the vehicle;

switching means operatively connected to said speedometer to produce an electric signal when said speedometer indicates that the vehicle cruising speed reaches a predetermined level or higher; and a valve operatively disposed in said exhaust gas by-pass passageway, said valve being opened to provide communication between the upstream and downstream sides of the turbine wheel when actuated on receiving said electric signal from said switching means.

* * * * *